US010965919B2

United States Patent
Takahashi et al.

(10) Patent No.: US 10,965,919 B2
(45) Date of Patent: Mar. 30, 2021

(54) PROJECTOR AND IMAGE DISPLAY METHOD

(71) Applicant: NEC Display Solutions, Ltd., Tokyo (JP)

(72) Inventors: Isao Takahashi, Tokyo (JP); Atsushi Kato, Tokyo (JP); Noriko Nagase, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 77 days.

(21) Appl. No.: 16/339,633

(22) PCT Filed: Oct. 18, 2016

(86) PCT No.: PCT/JP2016/080847
§ 371 (c)(1),
(2) Date: Apr. 4, 2019

(87) PCT Pub. No.: WO2018/073893
PCT Pub. Date: Apr. 26, 2018

(65) Prior Publication Data
US 2020/0186762 A1   Jun. 11, 2020

(51) Int. Cl.
*G03B 21/14* (2006.01)
*H04N 9/31* (2006.01)
(Continued)

(52) U.S. Cl.
CPC ......... *H04N 9/3111* (2013.01); *G03B 21/008* (2013.01); *G03B 33/08* (2013.01);
(Continued)

(58) Field of Classification Search
CPC ........................ G03B 21/008; G03B 21/2003; G03B 21/204; G03B 21/14; G03B 33/08;
(Continued)

(56) References Cited

U.S. PATENT DOCUMENTS 9,746,756 B2 * 8/2017 Hu .......................... F21V 14/08
9,897,901 B2 * 2/2018 Hu ........................ H04N 9/3164
(Continued)

FOREIGN PATENT DOCUMENTS

| CN | 103718103 A | 4/2014 |
| JP | 2004-126144 A | 4/2004 |
| JP | 2015-533225 A | 11/2015 |

OTHER PUBLICATIONS

Internatonal Search Report (ISR) (PCT Form PCT/ISA/210), in PCT/JP2016/080847, dated Dec. 20, 2016.
(Continued)

*Primary Examiner* — William C. Dowling
(74) *Attorney, Agent, or Firm* — McGinn IP Law Group, PLLC

(57) ABSTRACT

A projector that can increase the brightness of an image, includes: first and second image forming elements that each include micromirrors; a projection lens that projects images formed on the first and second image forming elements; and a light source/optical unit that irradiates the first and second image forming elements with first blue light and second blue light in a first display period, and irradiates the first image forming element with the green light and irradiates the second image forming element with the red light in a second display period.

7 Claims, 11 Drawing Sheets

(51) Int. Cl.
  *G03B 21/00*  (2006.01)
  *G03B 33/08*  (2006.01)
  *G03B 21/20*  (2006.01)

(52) U.S. Cl.
  CPC ........... *H04N 9/312* (2013.01); *H04N 9/3161* (2013.01); *G03B 21/204* (2013.01)

(58) Field of Classification Search
  CPC ........ H04N 9/31; H04N 9/3114; H04N 9/312; H04N 9/3105
  See application file for complete search history.

(56) References Cited

U.S. PATENT DOCUMENTS

| | | |
|---|---|---|
| 2005/0259225 A1 | 11/2005 | Greenberg et al. |
| 2015/0253654 A1 | 9/2015 | Hu et al. |
| 2017/0255087 A1* | 9/2017 | Hu ........................ G03B 21/206 |
| 2017/0255088 A1* | 9/2017 | Hu ........................ G02B 27/141 |
| 2017/0255090 A1* | 9/2017 | Hu ........................ H04N 9/312 |
| 2017/0255091 A1* | 9/2017 | Hu ........................ G03B 21/204 |
| 2017/0255092 A1* | 9/2017 | Hu ........................ G03B 21/204 |

OTHER PUBLICATIONS

Chinese Office Action (and Search Report), dated Aug. 26, 2020, in Chinese Application No. 201680090148.6 and English Translation thereof.

\* cited by examiner

[Figure 1]
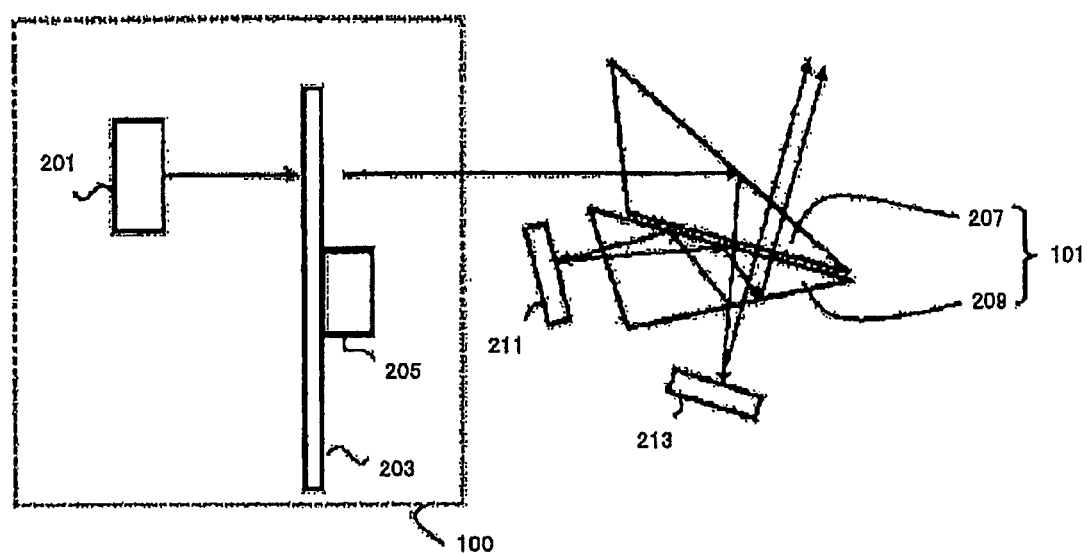
[Figure 2A]
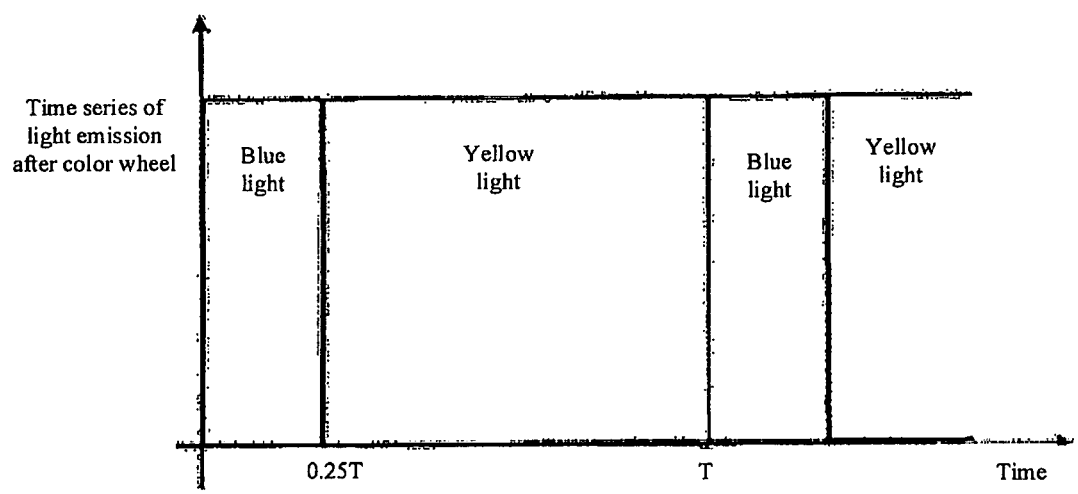

[Figure 2B]
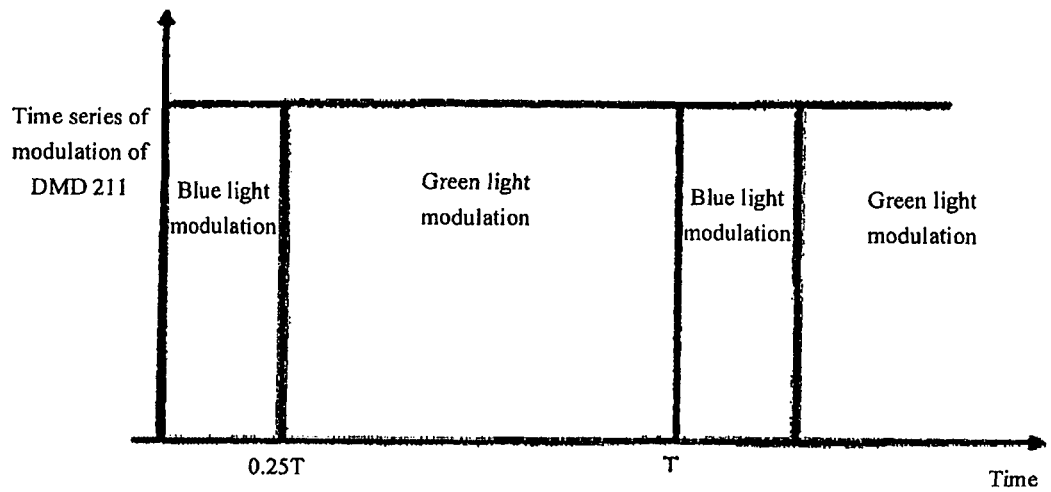
[Figure 2C]
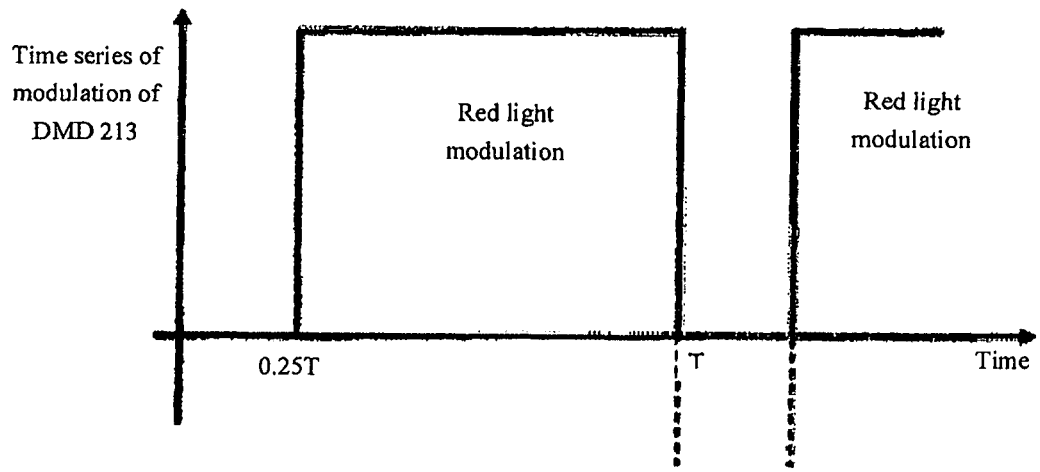

[Figure 3]
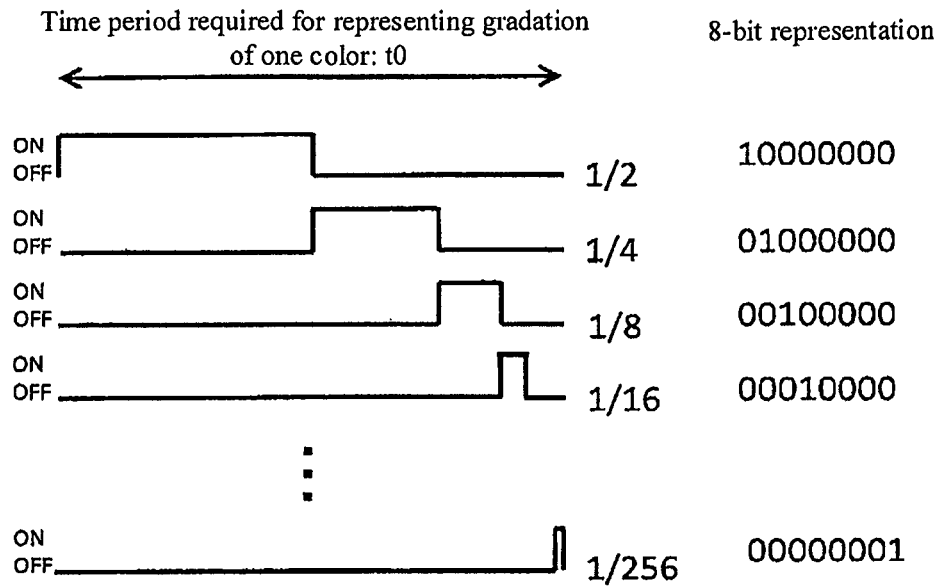
[Figure 4]
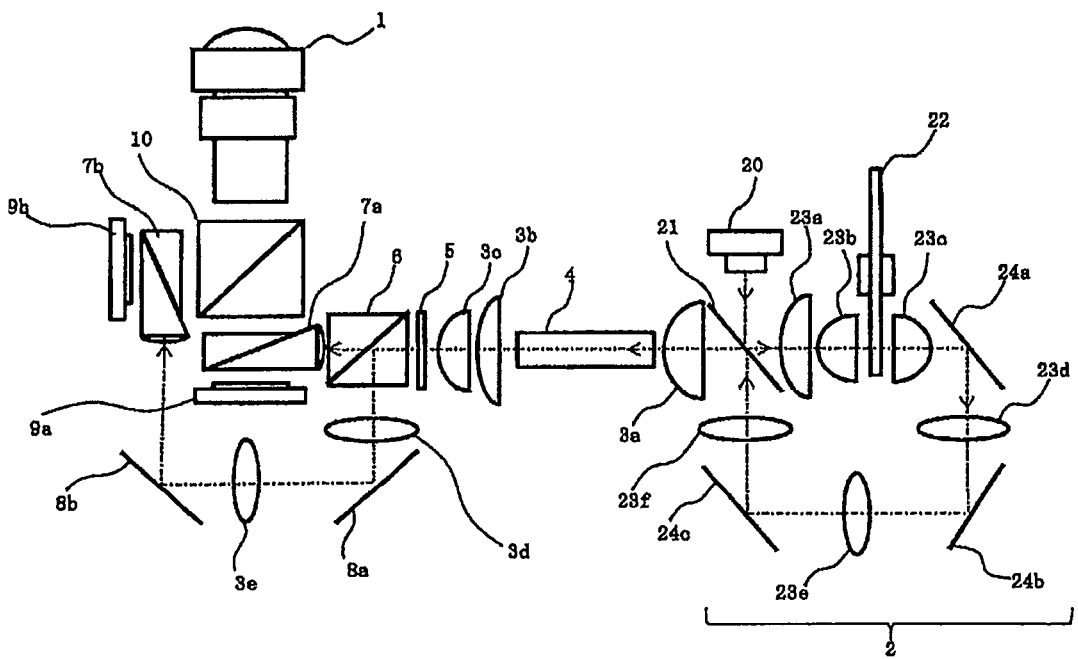

[Figure 5]
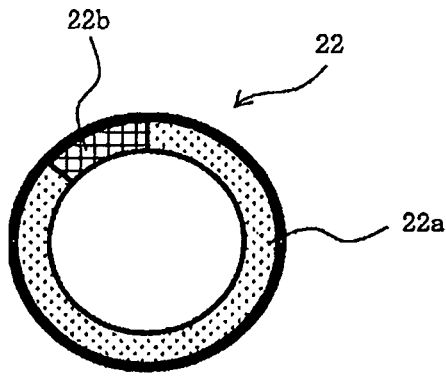
[Figure 6]
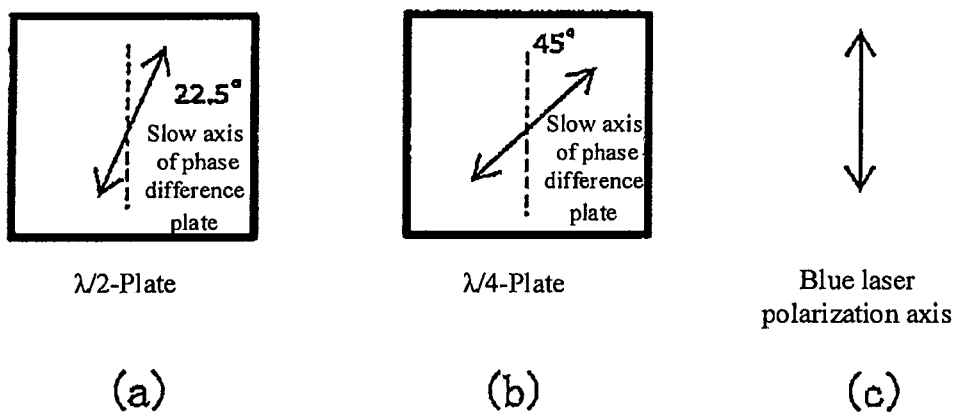
(a) λ/2-Plate  (b) λ/4-Plate  (c) Blue laser polarization axis
[Figure 7A]
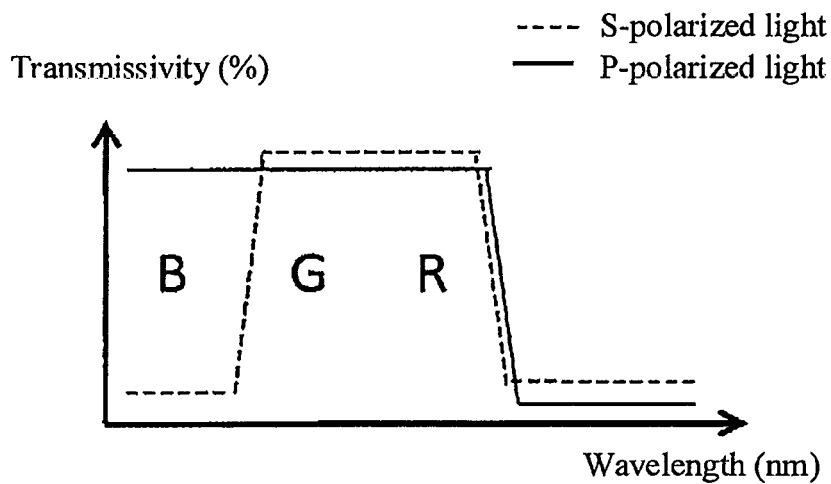

[Figure 7B]
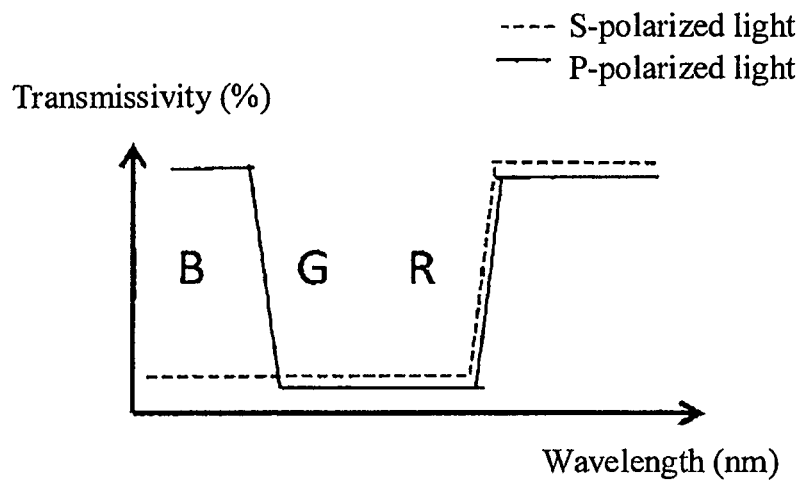
[Figure 8]
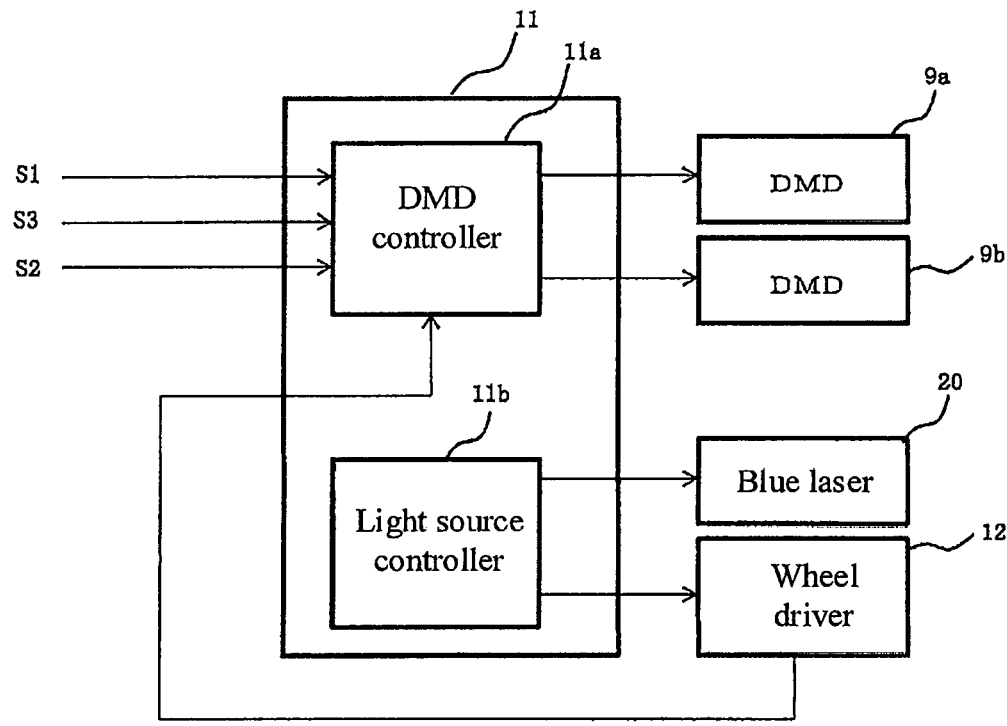

[Figure 9]
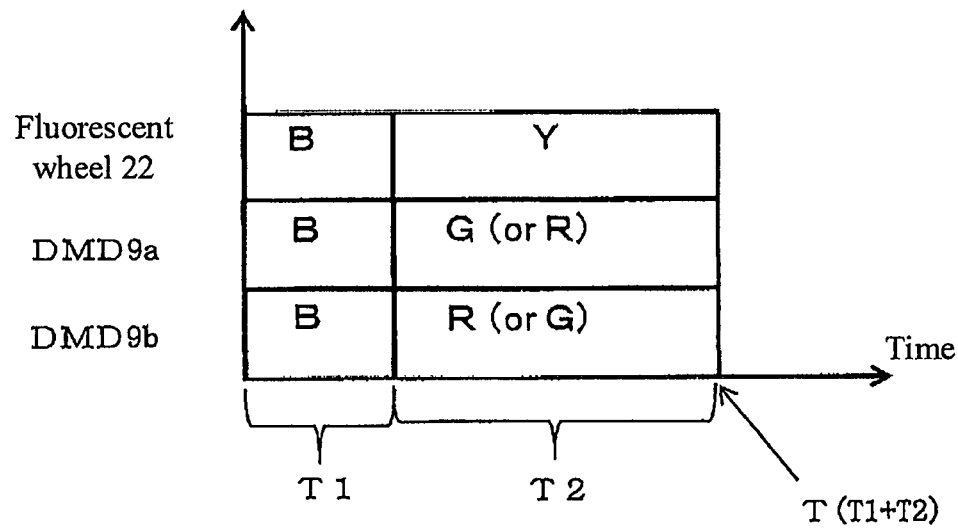
[Figure 10]
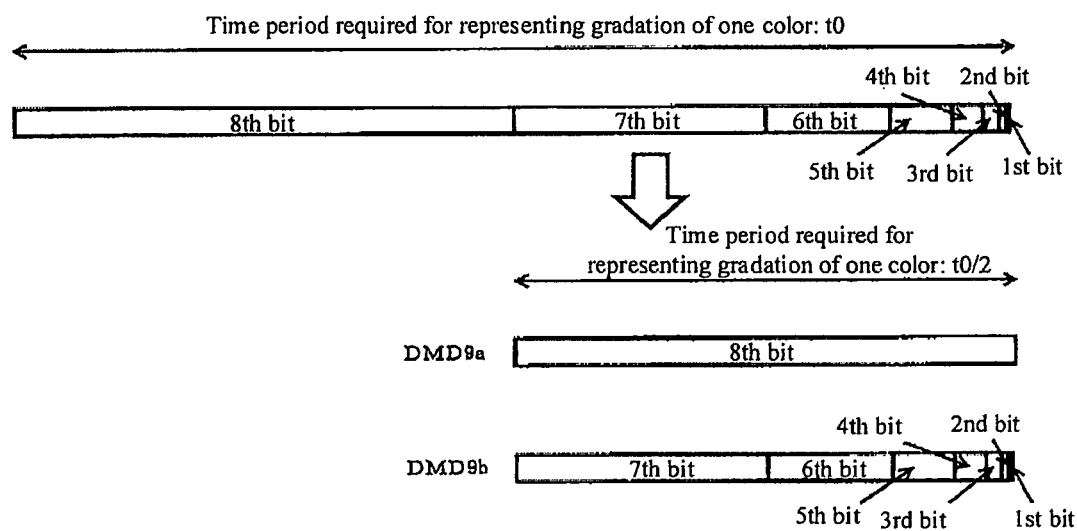

[Figure 11]
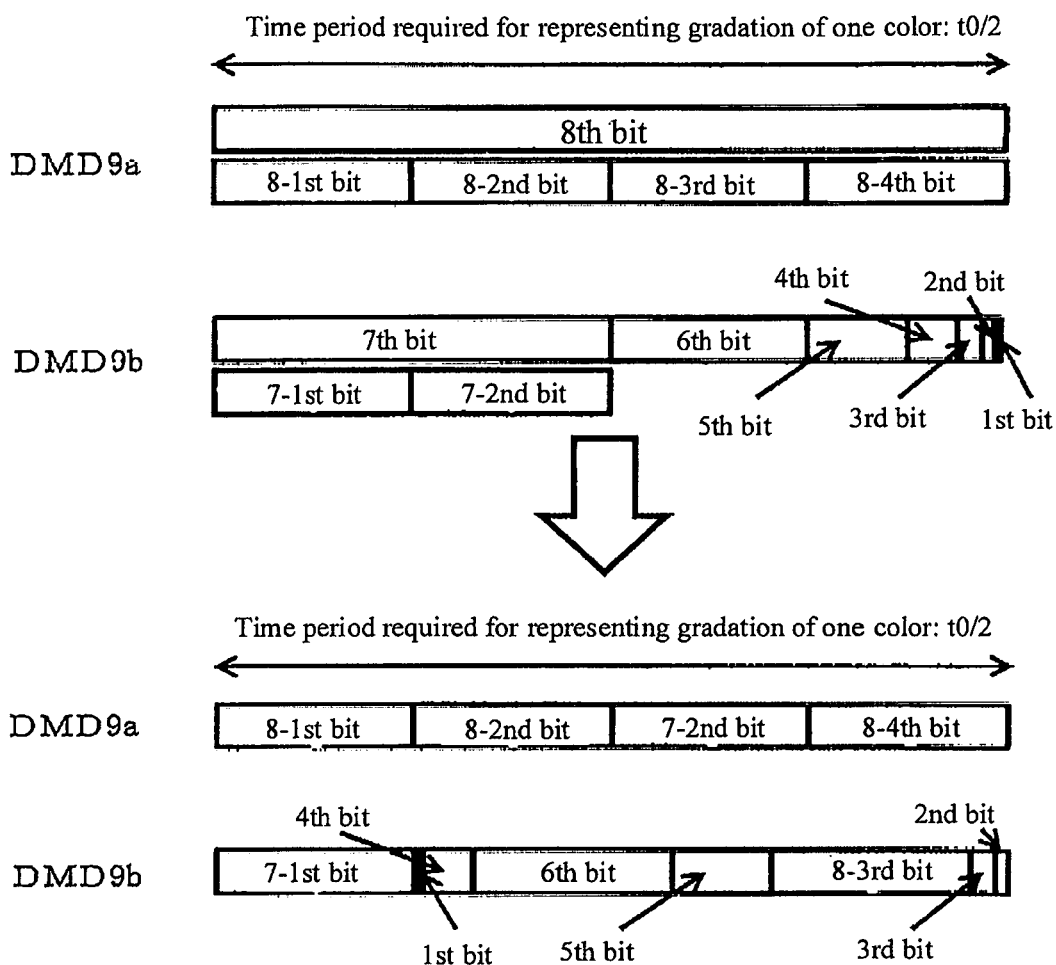

[Figure 12]
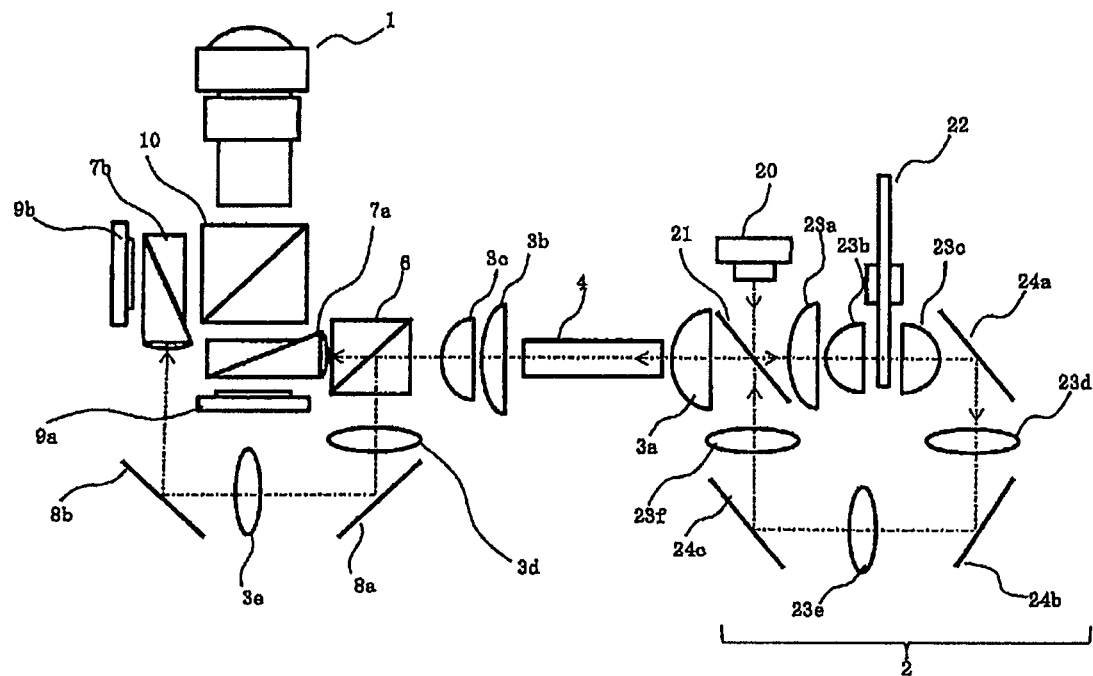
[Figure 13]
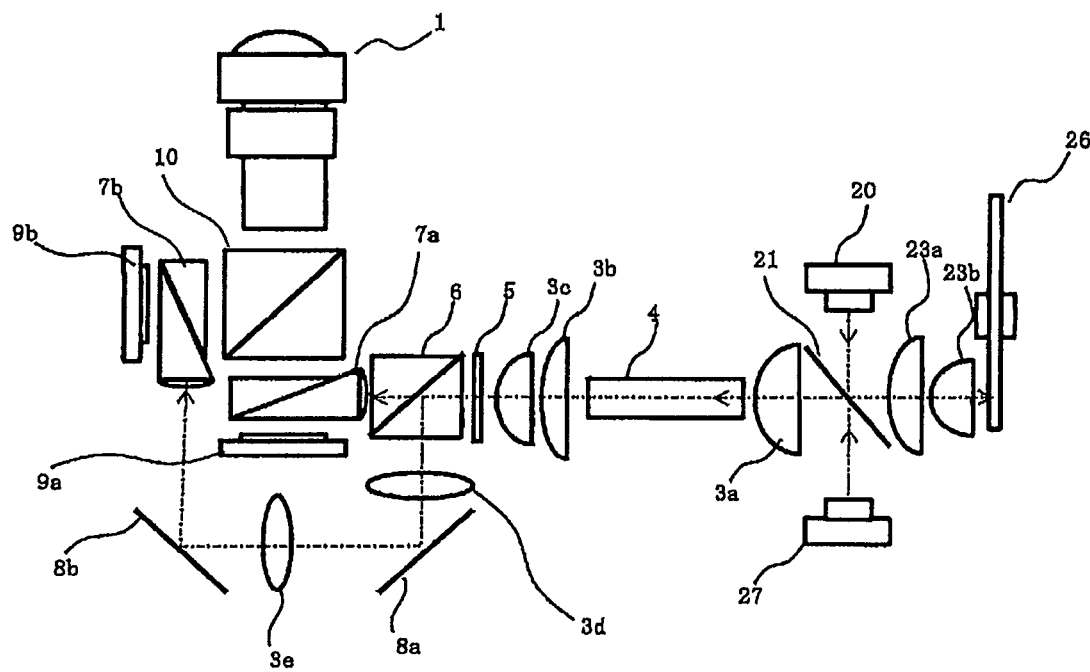

[Figure 14]
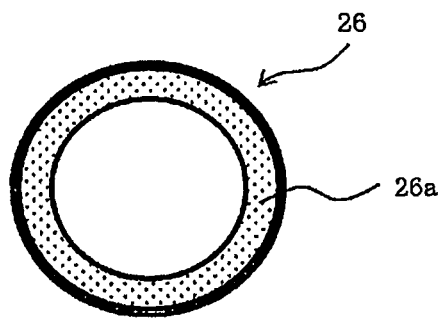
[Figure 15]
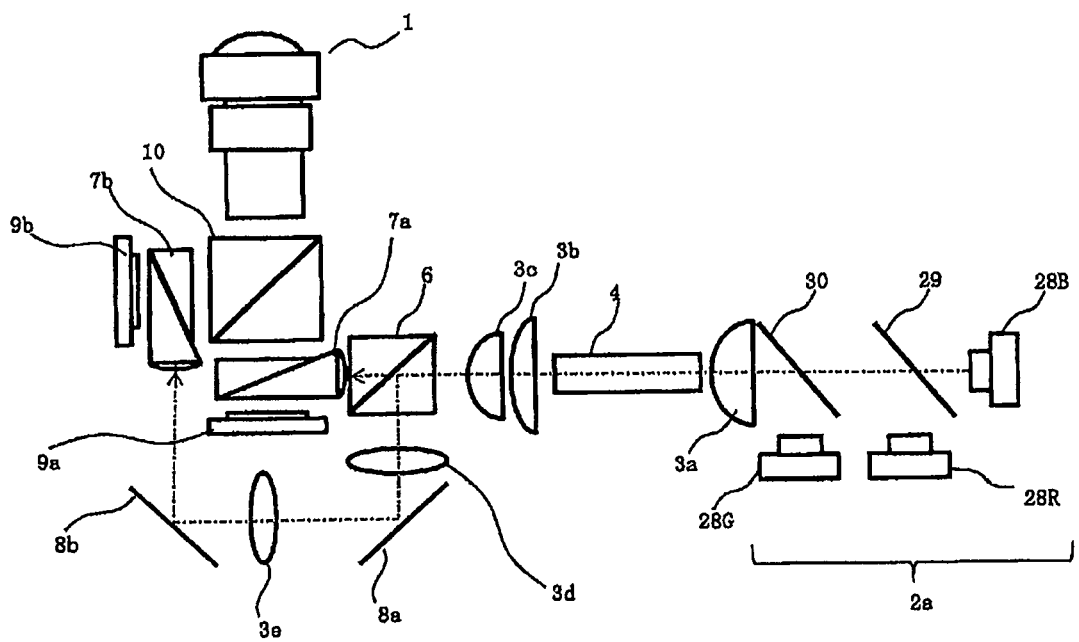

[Figure 16]
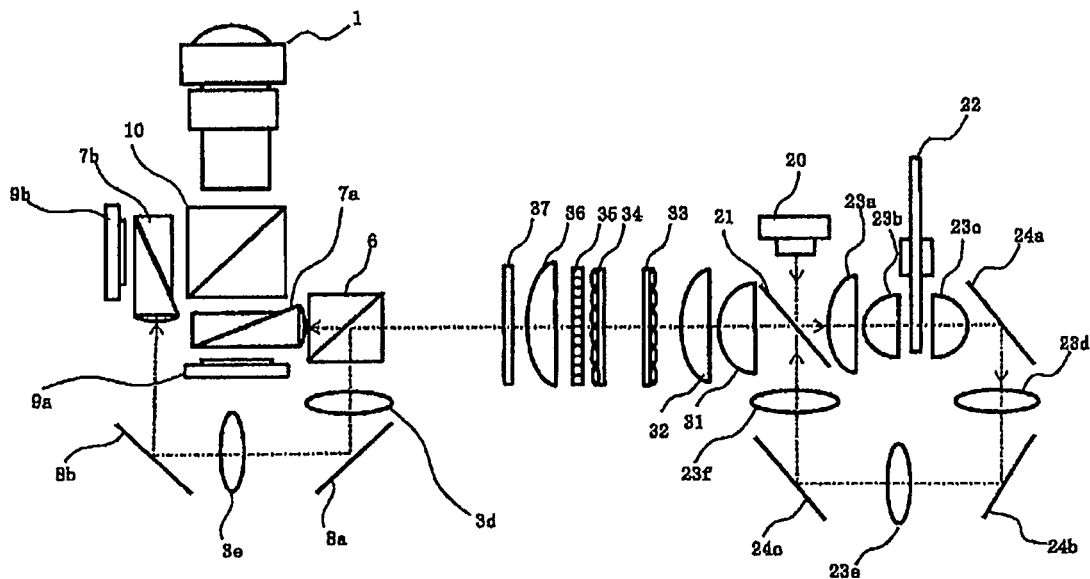
[Figure 17]
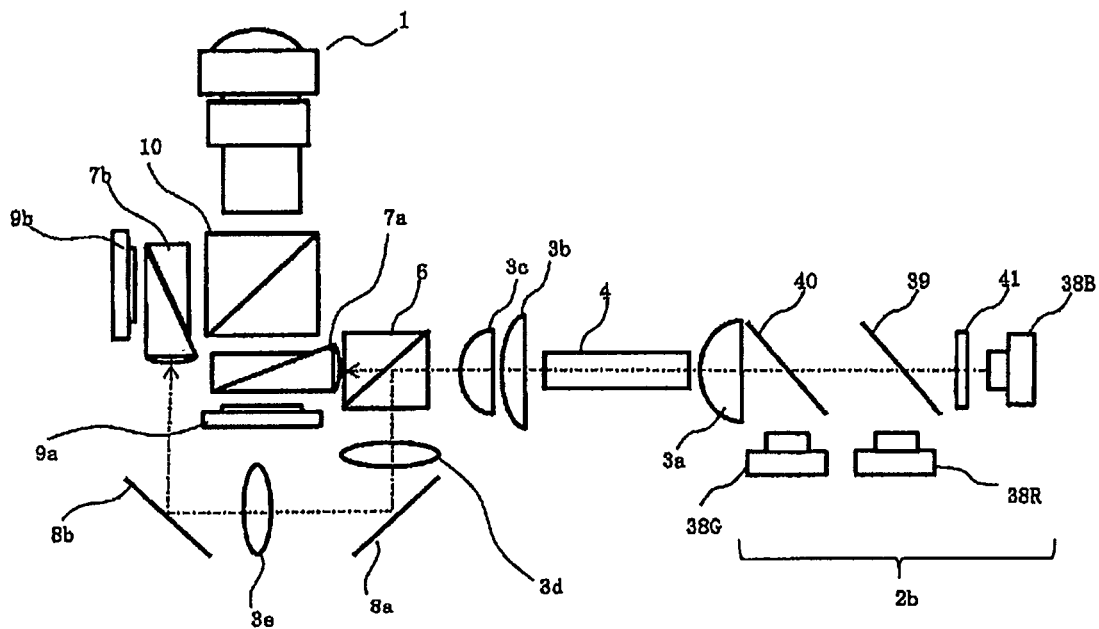

[Figure 18]
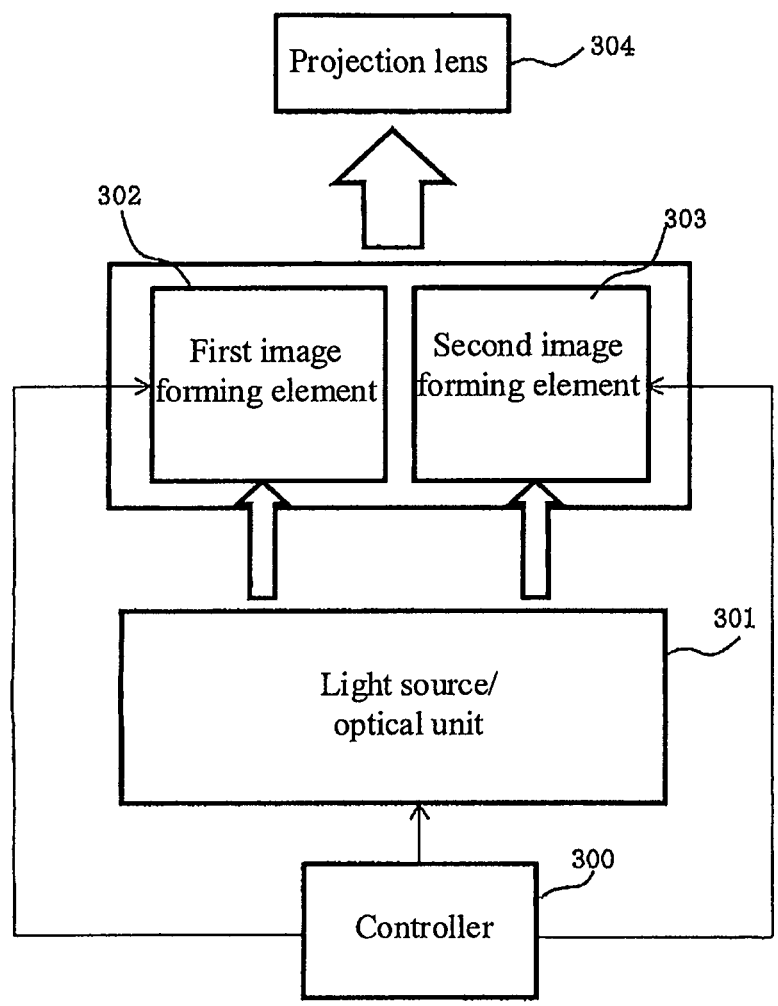

PROJECTOR AND IMAGE DISPLAY METHOD

TECHNICAL FIELD

The present invention relates to a projector and an image display method.

BACKGROUND ART

Projectors include three types, i.e., a three-plate type, a two-plate type and a single-plate type, according to the number of display panels.

The three-plate projector includes a light source, a color separation and combination optical system, three display panels, and a projection lens. White light from the light source is separated by the color separation and combination optical system into red light, blue light, and green light. The first, second and third display panels are irradiated with the red light, the blue light, and the green light, respectively. Image light of each color formed on the corresponding one of the first to third display panels is combined by the color separation and combination optical system and subsequently enters the projection lens. The three-plate projector has an advantage capable of effectively utilizing the white light from the light source, but has a problem in that the optical system for color separating and combining is complex, and the number of components is large.

The single-plate projector includes a light source, a color wheel, a display panel, and a projection lens. The color wheel includes a red filter, a blue filter and a green filter, which are formed along the circumferential direction. Rotation of the wheel allows the red filter, the blue filter and the green filter to be sequentially irradiated with the white light from the light source. The red filter transmits light in a red wavelength range, while reflecting or absorbing light in wavelength ranges other than the red wavelength range. The blue filter transmits light in a blue wavelength range, while reflecting or absorbing light in wavelength ranges other than the blue wavelength range. The green filter transmits light in green wavelength range, while reflecting or absorbing light in wavelength ranges other than the green wavelength range.

The display panel is irradiated sequentially with the red light having passed through the red filter, the blue light having passed through the blue filter and the green light having passed through the green filter, and a red image, a blue image and a green image are formed by the display panel in a time division manner. The projection lens projects the red image, the blue image and the green image, which are formed on the display panel.

Compared with the three-plate projector, the single-plate projector described above requires no optical system for color separating and combining, thereby exerting an advantage of reducing the number of components. However, owing to light absorbing or reflecting by the red filter, the blue filter and the green filter, only one third of the white light from the light source can be used. Accordingly, there is a problem in that the light utilization efficiency is low.

The two-plate projector can improve the problems of the single-plate and three-plate projectors described above. One example of the two-plate projector is described in Patent Literature 1.

FIG. 1 shows the configuration of the two-plate projector. The two-plate projector includes light emission device 100, spectroscopic system 101, and DMDs (digital micromirror devices) 211 and 213.

Light emission device 100 includes excitation light source 201, a color wheel that includes wavelength converting layer 203, and drive device 205 that rotates the color wheel. Excitation light source 201 emits excitation light (blue). Wavelength converting layer 203 is partitioned in the circumferential direction into first and second regions. The first region is a phosphor region that includes a yellow phosphor. The second region is a transmission region that transmits at least light in a blue wavelength range.

In a state where the color wheel is rotated, the first and second regions of wavelength converting layer 203 are sequentially irradiated with the excitation light (blue) from excitation light source 201. In the first region, yellow fluorescence is emitted from the yellow phosphor having received the excitation light (blue). That is, the excitation light (blue) is converted into yellow fluorescence in the first region. Meanwhile, the excitation light (blue) is transmitted as it is through the second region. The yellow fluorescence and the blue light are alternately emitted from wavelength converting layer 203.

Spectroscopic system 101 includes triangular-pole-shaped TIR (Total Internal Reflection) prisms 207 and 209. Spectroscopic system 101 disperses the yellow fluorescence from wavelength converting layer 203 into green light and red light, and allows DMD 211 to be irradiated with the green light while allowing DMD 213 to be irradiated with the red light. Spectroscopic system 101 allows DMD 211 to be irradiated with the blue light from wavelength converting layer 203.

DMD 211 alternately forms a green image and a blue image, while DMD 213 forms a red image. The green image light and the blue image light from DMD 211 enter a projection lens, not shown, through spectroscopic system 101. Likewise, the red image light from DMD 213 enters the projection lens through spectroscopic system 101. The projection lens projects the green image light, the blue image light, and the red image light.

FIG. 2A shows the time series of light emission after the color wheel of light emission device 100. With reference to time period T corresponding to one cycle of the color wheel, the blue light is output in a period of 0.25T, and the yellow light (fluorescence) is output in the remaining period of 0.75T.

FIG. 2B shows the time series of a modulation operation of DMD 211. FIG. 2C shows the time series of a modulation operation of DMD 213. As shown in FIGS. 2B and 2C, during the period of 0.25T, blue light is modulated at DMD 211, and the blue image is formed. On the other hand, during the period of 0.75T, the green light is modulated at DMD 211 to form the green image while the red light is modulated at DMD 213 to form the red image.

Typically, the DMD represents the gradation of the image using pulse-width modulation. FIG. 3 shows a DMD video signal when 256 gradations are represented by 8 bits.

According to the example shown in FIG. 3, the least significant bit (first bit) indicates a display time period representing a $1/256$ gradation level. The display time period is increased twice every bit toward the most significant bit (eighth bit), thereby representing 256 gradations. Time period t0 is a time period required for representing the gradation of one color, and is set by taking into consideration the drive frequency and the like of the DMD.

On the basis of the 8-bit video signal as shown in FIG. 3, each micromirror of the DMD is controlled to be turned on and off, which can form a 256-gradation image.

CITATION LIST

Patent Literature

Patent Literature 1: JP2015-533225A

DISCLOSURE OF THE INVENTION

Technical Problem

The relative luminosity is a numeric value representation of the intensity of brightness at each wavelength of light sensed by the human eye. In general, the relative luminosities of red and green are higher than the relative luminosity of blue. Accordingly, any increase in the ratio of display time periods for red and green per unit time period can increase the brightness of an image. Through use of this principle, for example, in the two-plate projector shown in FIG. 1, the display period for green at DMD 211 and the display period for red at DMD 213 are each set longer than 0.75T, thereby allowing the brightness of the image to be increased.

To increase the display period for green at DMD 211 and the display period for red at DMD 213, the display period for blue at DMD 211 is required to be reduced. Time period t0 that is required to display the 256-gradation blue image at one DMD is, for example, 1.4 ms in a case where the drive frequency for the DMD is 120 Hz (the period for a cycle is 8.3 ms). The time period cannot be further reduced. That is, the display period for blue at DMD 211 has a limitation due to time period t0. There is a problem in that owing to this limitation, the display period for green at DMD 211 and the display period for red at DMD 213 cannot be set sufficiently long.

An object of the present invention is to provide a projector and an image display method that can solve the above problem and increase the brightness of an image.

Solution to Problem

To achieve the above object, according to one aspect of the present invention, a projector is provided that includes:

first and second image forming elements that each include micromirrors each forming a pixel, the micromirrors each reflecting light in directions different according to an on-state and an off-state to allow images to be formed by reflected light from the micromirrors in the on-state;

a projection lens that projects the images formed on the first and second image forming elements; and a light source/optical unit that irradiates the first and second image forming elements with first blue light and second blue light in a first display period between first and second display periods that are obtained by dividing one frame period, and irradiates the first and second image forming elements with green light and red light in the second display period.

According to another aspect of the present invention, an image display method is provided that is performed in a projector including first and second image forming elements that each include micromirrors each forming a pixel, the micromirrors each reflecting light in directions different according to an on-state and an off-state to allow images to be formed by reflected light from the micromirrors in the on-state, the projector projecting the images formed on the first and second image forming elements, wherein the method irradiates the first and second image forming elements with first blue light and second blue light in a first display period between first and second display periods that are obtained by dividing one frame period, and irradiates the first and second image forming elements with green light and red light in the second display period.

BRIEF DESCRIPTION OF DRAWINGS

FIG. 1 is a schematic diagram showing a configuration of a two-plate projector according to a related art.

FIG. 2A shows the time series of light emission after a color wheel of a light emission device of the two-plate projector shown in FIG. 1.

FIG. 2B shows the time series of a modulation operation for one DMD of the two-plate projector shown in FIG. 1.

FIG. 2C shows the time series of a modulation operation for the other DMD of the two-plate projector shown in FIG. 1.

FIG. 3 illustrates a DMD video signal (pulse signal) in a case where 256 gradations are represented by 8 bits.

FIG. 4 is a schematic diagram showing the configuration of elements pertaining to an optical system of a two-plate projector according to a first example embodiment.

FIG. 5 is a schematic diagram showing a configuration of a phosphor wheel.

FIG. 6 illustrates the relationship between the retardation axis of a $\lambda/2$-plate, the retardation axis of a $\lambda/4$-plate, and the polarization axis of blue laser 20.

FIG. 7A is a characteristic diagram showing an example of film characteristics of a polarization dichroic prism.

FIG. 7B is a characteristic diagram showing another example of film characteristics of a polarization dichroic prism.

FIG. 8 is a block diagram showing a configuration of a signal processing/control system pertaining to image formation of the two-plate projector according to the first example embodiment.

FIG. 9 illustrates the relationship between emission timings of the blue light and the yellow fluorescence from the phosphor wheel, timings of irradiating one DMD with the blue light and green light, and timings of irradiating the other DMD with the blue light and red light.

FIG. 10 illustrates an example of a bit allocation process.

FIG. 11 illustrates another example of the bit allocation process.

FIG. 12 is a schematic diagram showing an optical system of a two-plate projector of a third example embodiment.

FIG. 13 is a schematic diagram showing an optical system of a two-plate projector of a fourth example embodiment.

FIG. 14 is a schematic diagram showing the configuration of the phosphor wheel.

FIG. 15 is a schematic diagram showing an optical system of a two-plate projector of a fifth example embodiment.

FIG. 16 is a schematic diagram showing an optical system of a two-plate projector of a sixth example embodiment.

FIG. 17 is a schematic diagram showing an optical system of a two-plate projector of a seventh example embodiment.

FIG. 18 is a block diagram showing a projector of an eighth example embodiment.

EXAMPLE EMBODIMENTS

Next, example embodiments are described with reference to the accompanying drawings.

First Example Embodiment

FIG. 4 is a schematic diagram showing the configuration of elements pertaining to an optical system of a two-plate projector according to a first example embodiment. In FIG. 4, for the sake of convenience, a blue optical path is indicated by chain lines.

Referring to FIG. 4, the projector includes projection lens 1, light source 2, lenses 3a to 3e, light tunnel 4, phase plate 5, polarization dichroic prisms 6 and 10, TIR prisms 7a and 7b, mirrors 8a and 8b, and DMDs 9a and 9b.

DMDs 9a and 9b have the same configuration, and each include micromirrors that each form a pixel. Each micromirror reflects light in directions that are different according to an on-state and an off-state. An image is formed by reflected light from the micromirrors in the on state. DMDs 9a and 9b can be called image forming elements.

Light source 2 includes blue laser 20, dichroic mirror 21, phosphor wheel 22, lenses 23a to 23f, and mirrors 24a to 24c.

Blue laser 22 outputs linearly polarized blue light. The blue light is used as excitation light for fluorescent excitation, and is also used as blue illumination light.

Dichroic mirror 21 has characteristics of reflecting, among visible light, light in the blue wavelength range and transmitting light in wavelength ranges other than the blue wavelength range. Dichroic mirror 21 is disposed at 45 degrees from the optical axis of blue laser 22. Blue light from blue laser 22 is incident at an incident angle of about 45 degrees. The blue light from blue laser 22 is reflected by dichroic mirror 21. The blue light, which is the reflected light, enters phosphor wheel 22 through lenses 23a and 23b.

FIG. 5 shows the configuration of phosphor wheel 22. As shown in FIG. 5, phosphor wheel 22 has a disk shape, and is partitioned into two segments in the circumferential direction. In one segment, yellow phosphor region 22a is formed. In the other segment, transmission region 22b is formed. Yellow phosphor region 22a contains a yellow phosphor that emits yellow fluorescence. Transmission region 22b is made up of an opening or a transmission diffuser plate. The transmission diffuser plate has characteristics of at least diffusing and transmitting the light in the blue wavelength range.

Phosphor wheel 22 is rotated by a driver (not shown), such as a motor, and yellow phosphor region 22a and transmission region 22b are sequentially irradiated with the blue light. In yellow phosphor region 22a, yellow fluorescence is emitted from the yellow phosphor excited by the blue light. A reflective film that reflects visible light is provided on an opposite surface (rear surface) of yellow phosphor region 22a, the rear surface being opposite to a surface (front surface) that the blue light enters. The yellow fluorescence traveling to the rear surface is reflected by the reflective film in the direction of the front surface.

Refer again to FIG. 4. The yellow fluorescence radiated from the surface of yellow phosphor region 22a enters dichroic mirror 21 through lenses 23a and 23b. Lenses 23a and 23b are condenser lenses, and have a role of condensing the blue light on phosphor wheel 22 and a role of converting the yellow fluorescence radiated from yellow phosphor region 22a into a substantially parallel light flux. The yellow fluorescence from yellow phosphor region 22a passes through dichroic mirror 21.

The blue light having passed through transmission region 22b of phosphor wheel 22 enters mirror 24a through lens 22. Lens 22 is a condenser lens, and converts the blue light from transmission region 22b into a substantially parallel light flux. Mirror 24a is disposed at an angle of 45 degrees from the optical axis of lens 22. The blue light is incident thereon at an angle of about 45 degrees.

The blue light reflected by mirror 24a travels sequentially via lens 23d, mirror 24b, lens 23e, mirror 24c and lens 23f, and enters a surface of dichroic mirror 21 opposite to a surface that the blue light from blue laser 20 enters. Lenses 23d to 23f are relay lenses. The optical axis of lens 23f substantially coincides with the optical axis of blue laser 20.

The blue light from lens 23f is reflected by dichroic mirror 21. The reflected blue light travels on an optical path identical to that of the yellow fluorescence having passed through dichroic mirror 21, and enters lens 3a. The yellow fluorescence is mixed-color light that contains red and green light components. The output light of light source 2 is the blue light and the yellow fluorescence (mixed-color light). Light source 2 alternately outputs the blue light and the yellow fluorescence (mixed-color light).

The output light of light source 2 (the blue light and the yellow fluorescence) enters light tunnel 4 through lens 3a. Lens 3a is a condenser lens. Light tunnel 4 includes a hollow light guide including four mirrors pasted onto each other. In light tunnel 4, light incident on one end face travels in the light guide while being repeatedly reflected, thereby making the light intensity distribution on the plane of the other end face uniform. Instead of light tunnel 4, a rod (also called a rod lens) that includes a solid light guide made of transparent material, such as glass.

Lenses 3b and 3c are provided nearer to the emission end of light tunnel 4. Lenses 3b and 3c respectively form, on DMDs 9a and 9b, optical images of a planar light source made up of the emission surface of light tunnel 4.

The blue light and the yellow fluorescence emitted from the emission surface of light tunnel 4 enter polarization dichroic prism 6 through lenses 3b and 3c and phase plate 5. The blue light output from blue laser 20 is linearly polarized light. The polarization axis of blue laser 20 and the optical axis (advancement axis or retardation axis) of phase plate 5 are configured so as to polarization-separate the linearly polarized blue light at polarization dichroic prism 6 into transmitted light and reflected light that have the same light intensity.

A $\lambda/2$-plate or a $\lambda/4$-plate is adopted as phase plate 5. FIG. 6 shows the retardation axis of the $\lambda/2$-plate, the retardation axis of the $\lambda/4$-plate, and the polarization axis of blue laser 20. In FIG. 6, a part (a) of the diagram shows the retardation axis of the $\lambda/2$-plate, a part (b) of the diagram shows the retardation axis of the $\lambda/4$-plate, and a part (c) of the diagram shows the polarization axis of blue laser 20.

The retardation axis of the $\lambda/2$-plate shown in FIG. 6 is inclined by 22.5° from the polarization axis of the blue laser. In this case, the $\lambda/2$-plate rotates, by 45°, the linearly polarized blue light from blue laser 20. Accordingly, the linearly polarized blue light emitted from the $\lambda/2$-plate is separated by polarization dichroic prism 6 into transmitted light and reflected light that have the same light intensity. From among the transmitted light and the reflected light, one is s-polarized light, and the other is p-polarized light.

The retardation axis of the $\lambda/4$-plate shown in FIG. 6 is inclined by 45° from the polarization axis of the blue laser. In this case, the $\lambda/4$-plate converts the linearly polarized blue light from blue laser 20 into circularly polarized light. The circularly polarized blue light emitted from the $\lambda/4$-plate is separated by polarization dichroic prism 6 into transmitted light and reflected light that have the same light intensity. From among the transmitted light and the reflected light, one is s-polarized light, and the other is p-polarized light.

Meanwhile, the polarization of the yellow fluorescence is random. Accordingly, the random polarization is maintained even after the fluorescence passes through phase plate 5. The yellow fluorescence emitted from phase plate 5 is color-separated by polarization dichroic prism 6 into green light and red light.

The film characteristics of polarization dichroic prisms 6 and 10 are the same. FIGS. 7A and 7B show examples of film characteristics used for polarization dichroic prisms 6 and 10. According to the film characteristics in FIG. 7A, for the p-polarized light, light in blue (B) and green (G) wavelength ranges is transmitted while light in a red (R) wavelength range is reflected, and for the s-polarized light, light in the blue (B) and red (R) wavelength ranges is reflected while light in the green (G) wavelength range is transmitted. On the other hand, according to the film characteristics in FIG. 7B, for the p-polarized light, light in the blue (B) and red (R) wavelength ranges is transmitted while light in the green (G) wavelength range is reflected, and for the s-polarized light, light in the blue (B) and green (G) wavelength ranges is reflected while light in the red (R) wavelength range is transmitted.

In a case where polarization dichroic prism 6 has the film characteristics in FIG. 7A, the transmitted green light and the p-polarized transmitted blue light are alternately irradiated to DMD 9a via TIR prism 7a, and the reflected red light and the s-polarized reflected blue light are alternately irradiated to DMD 9b via lens 3d, mirror 8a, lens 3e, mirror 8b and TIR prism 7b. Lenses 3d to 3e are relay lenses.

In the above case, DMD 9a alternately forms the green image and the blue image, and DMD 9b alternately forms the red image and the blue image. The green image light and the blue image light (p-polarized light) enter polarization dichroic prism 10 from DMD 9a through TIR prism 7a. The red image light and the blue image light (s-polarized light) enter polarization dichroic prism 10 from DMD 9b through TIR prism 7b. Polarization dichroic prism 10 also has the film characteristics in FIG. 7A. Accordingly, the green image light and the blue image light (p-polarized light) pass through polarization dichroic prism 10 and enter projection lens 1, while the red image light and the blue image light (s-polarized light) are reflected by polarization dichroic prism 10 and enter projection lens 1.

On the other hand, in a case where polarization dichroic prism 6 has the film characteristics in FIG. 7B, the transmitted red light and the p-polarized transmitted blue light are alternately irradiated to DMD 9a through TIR prism 7a, and the reflected green light and the s-polarized reflected blue light are alternately irradiated to DMD 9b via lens 3d, mirror 8a, lens 3e, mirror 8b and TIR prism 7b.

In the above case, DMD 9a alternately forms the red image and the blue image, and DMD 9b alternately forms the green image and the blue image. The red image light and the blue image light (p-polarized light) enter polarization dichroic prism 10 from DMD 9a through TIR prism 7a. The green image light and the blue image light (s-polarized light) enter polarization dichroic prism 10 from DMD 9b through TIR prism 7b. Polarization dichroic prism 10 also has the film characteristics in FIG. 7B. Accordingly, the red image light and the blue image light (p-polarized light) pass through polarization dichroic prism 10 and enter projection lens 1, while the green image light and the blue image light (s-polarized light) are reflected by polarization dichroic prism 10 and enter projection lens 1.

The optical system described above can form the red image and the blue image on one of DMDs 9a and 9b, and form the green image and the blue image on the other. Elements made up of light source 2 and the optical system for irradiating DMDs 9a and 9b with the light from light source 2 can be called a light source/optical unit.

Next, the configuration of a signal processing/control system pertaining to image formation is described.

FIG. 8 is a block diagram showing the configuration of the signal processing/control system pertaining to image formation of the two-plate projector according to the first example embodiment.

Referring to FIG. 8, the projector of this example embodiment includes controller 11, and wheel driver 12. Controller 11 receives, as an input, a multiple-bit video signal where the gradation of each pixel is represented in a multiple-digit binary number, for each of the red image, the blue image and the green image. Here, 8-bit G video signal S1, 8-bit R video signal S2 and 8-bit B video signal S3 are input into controller 11. These 8-bit video signals S1 to S3 can be obtained from a video signal (RGB signal) supplied from an external video apparatus (e.g., a personal computer etc.).

Wheel driver 12 is a motor or the like, and rotates phosphor wheel 22. Controller 11 includes: DMD controller 11a that controls the operations of DMDs 9a and 9b on the basis of 8-bit video signals S1 to S3; and light source controller 11b that controls the operation of wheel driver 12 and the operation of blue laser 20.

Light source controller 11b accepts an operation signal according to a predetermined input operation from an operation section, not shown, supplies wheel driver 13 with a drive signal for rotating phosphor wheel 22, and turns on blue laser 20. Wheel driver 13 rotates phosphor wheel 22 at a predetermined rate according to the drive signal from light source controller 11b, and supplies DMD controller 11a with a timing signal that indicates emission timings of the blue light and the yellow fluorescence from phosphor wheel 22. For example, the timing signal can be generated using a rotary encoder.

The blue light and the yellow fluorescence are alternately emitted from phosphor wheel 22, DMD 9a is irradiated alternately with the blue light and the green light (or the red light), and DMD 9b is irradiated alternately with the blue light and the red light (or the green light). Here, for the sake of convenience, it is assumed that DMD 9a alternately forms the green image and the blue image, and DMD 9b alternately forms the red image and the blue image.

FIG. 9 shows the relationship between emission timings of the blue light and the yellow fluorescence from the phosphor wheel 22, timings of irradiating DMD 9a with the blue light and the green light, and timings of irradiating DMD 9b with the blue light and the red light. As shown in FIG. 9, the irradiation timing of DMD 9a with the blue light is the same as the irradiation timing of DMD 9b with the blue light. The irradiation timing of DMD 9a with the green light is the same as the irradiation timing of DMD 9b with the red light. Provided that a blue irradiation period is T1 and a green/red irradiation period is T2, there is a relationship T2<T1. Period T (=T1+T2) is a time period (cycle) during which phosphor wheel 22 rotates one time. Here, period T1 and period T2 can be respectively called first and second display periods, which are obtained by dividing one frame period.

DMD controller 11a identifies blue irradiation period T1 and green/red irradiation period T2 on the basis of the timing signal from wheel driver 13. In green/red irradiation period T2, DMD controller 11a controls on and off of the micromirrors of DMD 9a to form the green image, on the basis of 8-bit G video signal S1, and controls on and off of the micromirrors of DMD 9b to form the red image on the basis of 8-bit R video signal S2. In blue irradiation period T1, DMD controller 11a controls on and off of the micromirrors of each of DMDs 9a and 9b to form the blue signal, on the basis of B video signal S3.

To form the blue image, DMD controller 11a performs a process (bit allocation process) of allocating the bits of B video signal S3 to DMDs 9a and 9b.

FIG. 10 shows an example of the bit allocation process. DMD controller 11a allocates an eighth bit in 8-bit B video signal S3 to DMD 9a, and allocates remaining first to seventh bits to DMD 9b. At DMD 9a, micromirror on and off control is performed on the basis of a period indicated by the eighth bit of B video signal S3. At DMD 9b, micromirror on and off control is performed on the basis of periods indicated by the first to seventh bits of B video signal S3.

The projector of this example embodiment forms a 256-gradation blue image by combining modulation based on the eighth bit at DMD 9a and modulation based on the first to seventh bits at DMD 9b. A time period required to display the blue image in this time is half of time period t0 required to display the 256-gradation blue image on one DMD. The blue image display time period can be reduced from t0 to t0/2 as described above. Accordingly, the green image display time period at DMD 9a and the red image display time period at DMD 9b can be increased. Consequently, a bright image can be provided.

In the above description, DMD 9a displays the green image, and DMD 9b displays the red image. In an opposite manner, DMD 9a may display the red image, and DMD 9b displays the green image. Also in this case, the blue image display time period can be reduced. Accordingly, the red image display time period at DMD 9a and the green image display time period at DMD 9b can be increased. Consequently, a bright image can be provided.

Second Example Embodiment

The projector in this example embodiment includes the optical system and the signal processing/control system described in the first example embodiment. However, the bit allocation process in DMD controller 11a is different from that in the first example embodiment. Here, the configuration elements that are different from those in the first example embodiment are described. The description on the same configuration elements is omitted.

FIG. 11 shows an example of the bit allocation process in DMD controller 11a. DMD controller 11a divides the period for the eighth bit in B video signal S3 into four divided-bit periods for an 8-1st bit, 8-2nd bit, 8-3rd bit and 8-4th bit, and divides the period for the seventh bit in B video signal S3 into two divided-bit periods for a 7-1st bit and 7-2nd bit. The divided-bit periods for the 8-1st bit, 8-2nd bit, 8-3rd bit and 8-4th bit, and the divided-bit periods for the 7-1st bit and 7-2nd bit are each the same time length (t0/8).

DMD controller 11a allocates, to DMD 9a, a divided-bit period obtained by combining some of the four divided-bit periods for the eighth bit and the two divided-bit periods for the seventh bit so as to achieve time period t0/2, and allocates the remaining bit to DMD 9b. Here, DMD controller 11a allocates the 8-1st bit, 8-2nd bit, 8-4th bit and 7-2nd bit to DMD 9b, and allocates the remaining bits (the first to sixth bits, 7-1st bit and 8-3rd bit) to DMD 9b.

The projector of this example embodiment forms the 256-gradation blue image by combining modulation based on the 8-1st bit, 8-2nd bit, 8-4th bit and 7-2nd bit at DMD 9a and modulation based on the first to sixth bits, 7-1st bit and 8-3rd bit at DMD 9b. Also in this case, as with the first example embodiment, the time period required to display the blue image is half of time period t0 required to display the 256-gradation blue image on one DMD. Consequently, the blue image display time period is reduced from t0 to t0/2. Accordingly, the green image display time period at DMD 9a and the red image display time period at DMD 9b can be increased. As a result, a bright image can be provided.

The bits to be divided are not limited to the eighth and seventh bits. Bits among the second to eighth bits may be divided and combined so that the blue image display period on DMDs 9a and 9b can be each t0/2.

Third Example Embodiment

FIG. 12 is a schematic diagram showing an optical system of a two-plate projector according to a third example embodiment. The optical system of the projector in this example embodiment is different from the optical system described in the first example embodiment in that phase plate 5 is not included. In FIG. 12, for the sake of convenience, a blue optical path is indicated by chain lines.

In this example embodiment, linearly polarized blue light from blue laser 20 is polarization-separated by polarization dichroic prism 6 into transmitted blue light and reflected blue light that have the same light intensity. To achieve this polarization separation, blue laser 20 is disposed so as to cause the polarization axis to be in a direction of 45°, or disposed so as to make the p-polarized light and the s-polarized light have the same light intensity.

The signal processing/control system is the same as that described in the first or second example embodiment. The projector in this example embodiment also exerts working-effects analogous to those in the first or second example embodiment.

Fourth Example Embodiment

FIG. 13 is a schematic diagram showing an optical system of a two-plate projector according to a fourth example embodiment. The optical system of the projector in this example embodiment is different from the optical system described in the first example embodiment in that lenses 23c to 23 and mirrors 24a to 24c are omitted, phosphor wheel 26 is adopted instead of phosphor wheel 22, and blue laser 27 is further adopted. Blue laser 20 is used as an excitation light source. Blue laser 27 is used as blue light source. In FIG. 13, for the sake of convenience, a blue optical path is indicated by chain lines.

FIG. 14 shows the configuration of phosphor wheel 26. Phosphor wheel 26 has a disk shape, and includes yellow phosphor region 26a formed over the entire periphery. Phosphor wheel 26 is rotated by a driver (not shown), such as a motor, and yellow phosphor region 26a is irradiated with the blue light from blue laser 20. In yellow phosphor region 26a, yellow fluorescence is emitted from the yellow phosphor excited by the blue light. A reflective film that reflects visible light is provided on a surface (rear surface) of yellow phosphor region 26a, the rear surface being opposite to a surface (front surface) that the blue light enters. The yellow fluorescence traveling toward the rear surface is reflected by the reflective film in a direction to the front surface.

Blue laser 27 outputs blue light. Blue light from blue laser 27 enters, at an incident angle of about 45 degrees, a surface of dichroic mirror 21 that is opposite to a surface that blue light (excitation light) from blue laser 20 enters. Dichroic mirror 21 reflects the blue light from blue laser 27 toward light tunnel 4.

The blue light from dichroic mirror 21 passes through lens 3a, light tunnel 4, lens 3b, lens 3c and phase plate 5, and enters polarization dichroic prism 6. The blue light output from blue laser 27 is linearly polarized light. The polarization axis of blue laser 27 and the optical axis (advancement axis or retardation axis) of phase plate 5 are configured so as to polarization-separate the linearly polarized blue light at polarization dichroic prism 6 into transmitted light and reflected light that have the same light intensity. Specifically, phase plate 5 is a λ/2-plate or a λ/4-plate. As shown in FIG. 6, the polarization axis of blue laser 27 and the optical axis (advancement axis or retardation axis) of phase plate 5 are configured.

The signal processing/control system has the configuration described in the first or second example embodiment, but is different in that light source controller 11b alternately turns on blue laser 20 and blue laser 27 at a predetermined cycle. In this case, the on-period of blue laser 20 corresponds to period T2 shown in FIG. 9, and the on-period of blue laser 27 corresponds to period T1 shown in FIG. 9. The other operations are as described in the first or second example embodiment.

The projector in this example embodiment also exerts working-effects analogous to those in the first or second example embodiment.

A configuration may be adopted such that in the optical system shown in FIG. 13, phase plate 5 is removed, the linearly polarized blue light from blue laser 27 is polarization-separated by polarization dichroic prism 6 into transmitted blue light and reflected blue light that have the same light intensity. To achieve this polarization separation, blue laser 27 is disposed so as to cause the polarization axis to be in a direction of 45°, or disposed so as to make the p-polarized light and the s-polarized light have the same light intensity.

In the optical system shown in FIG. 13, instead of phosphor wheel 22, a fixed yellow fluorescent section that does not rotate may be adopted.

Furthermore, if the light intensity for achieving white balance can be secured, a blue LED (Light Emitting Diode) may be adopted instead of blue laser 27. In this case, phase plate 5 is not required.

Fifth Example Embodiment

FIG. 15 is a schematic diagram showing an optical system of a two-plate projector according to a fifth example embodiment. The optical system of the projector in this example embodiment is different from the optical system described in the first example embodiment in that phase plate 5 is removed and light source 2a is adopted instead of light source 2. In FIG. 15, for the sake of convenience, a blue optical path is indicated by chain lines.

Light source 2a includes green LED 28G, red LED 28R, blue LED 28B, and dichroic mirrors 29 and 30. The optical axis of red LED 28R and the optical axis of blue LED 28B are orthogonal to each other. Dichroic mirror 29 is disposed at the intersection of these optical axes. Dichroic mirror 29 has film characteristics of transmitting light in the blue wavelength range and reflecting light in the red wavelength range.

Blue light from blue LED 28B enters one surface of dichroic mirror 29 at an incident angle of about 45 degrees. Red light from red LED 28R enters the other surface of dichroic mirror 29 at an incident angle of about 45 degrees. The blue light from blue LED 28B passes through dichroic mirror 29. Red light from red LED 28R is reflected by dichroic mirror 29 in a direction identical to that of the transmitted blue light. The optical axis of emitted light from dichroic mirror 29 (transmitted blue light and reflected red light) coincides with the optical axis of blue LED 28B.

The optical axis of emitted light from dichroic mirror 29 and the optical axis of green LED 28G are orthogonal to each other. Dichroic mirror 30 is disposed at the intersection of these optical axes. Dichroic mirror 30 has film characteristics of transmitting light in the blue wavelength range and light in the red wavelength range, and reflecting light in the green wavelength range.

The emitted (blue/red) light from dichroic mirror 29 enters one surface of dichroic mirror 30 at an incident angle of about 45 degrees. Green light from green LED 28G enters the other surface of dichroic mirror 30 at an incident angle of about 45 degrees. The blue light and red light from dichroic mirror 29 passes through dichroic mirror 30. Green light from green LED 28G is reflected by dichroic mirror 30 in a direction identical to that of the transmitted blue/red light. The optical axis of emitted light from dichroic mirror 30 (transmitted blue/red light and reflected green light) coincides with the optical axis of blue LED 28B.

The emitted (blue/red/green) light from dichroic mirror 30 is the output light of light source 2a. The output (blue/red/green) light of light source 2a passes through lens 3a, light tunnel 4, lens 3b and lens 3c, and enters polarization dichroic prism 6.

In a case where polarization dichroic prism 6 has the film characteristics in FIG. 7A, the green light passes through polarization dichroic prism 6, and the red light is reflected by polarization dichroic prism 6. The blue light is polarization-separated by polarization dichroic prism 6 into transmitted light and reflected light that have the same light intensity.

On the other hand, in a case where polarization dichroic prism 6 has the film characteristics in FIG. 7B, the red light passes through polarization dichroic prism 6, and the green light is reflected by polarization dichroic prism 6. The blue light is polarization-separated by polarization dichroic prism 6 into transmitted light and reflected light that have the same light intensity.

The signal processing/control system has the configuration described in the first or second example embodiment, but is different in that light source controller 11b alternately turns on green LED 28G, red LED 28R and blue LED 28B at a predetermined cycle. Specifically, light source controller 11b turns off green LED 28G and red LED 28R and turns on blue LED 28B in period T1 shown in FIG. 9, and turns on both green LED 28G and red LED 28R and turns off blue LED 28B in period T2 shown in FIG. 9. The other operations are as described in the first or second example embodiment.

The projector in this example embodiment also exerts working-effects analogous to those in the first or second example embodiment.

Sixth Example Embodiment

FIG. 16 is a schematic diagram showing an optical system of a two-plate projector according to a sixth example embodiment. In the optical system of the projector according to this example embodiment, polarization prisms 6a and 10a are adopted instead of polarization dichroic prisms 6 and 10, and lenses 31 and 32, fly-eye integrators 33 and 34, polarization conversion element 35, field lens 36 and wavelength selection phase plate 37 are adopted instead of lenses 3a to 3c, light tunnel 4 and phase plate 5. The other elements are analogous to those of the optical system described in the first example embodiment. In FIG. 16, for the sake of convenience, a blue optical path is indicated by chain lines.

The output light of light source 2 (the blue light and the yellow fluorescence) passes through lenses 31 and 32 and fly-eye integrators 33 and 34, and enters polarization conversion element 35. Lenses 31 and 32 convert the output light of light source 2 (the blue light and the yellow fluorescence) into a substantially parallel light flux. Fly-eye integrators 33 and 34 are for making the light intensity of the light flux that passed through lenses 31 and 32 uniform, and include lens cells disposed in a matrix manner. Polarization conversion element 35 aligns the polarization direction of the light flux from fly-eye integrators 33 and 34, and includes a polarization beam splitter and a phase plate.

The (blue/yellow) light converted into linearly polarized light is emitted from polarization conversion element 35, passes through field lens 36, and enters wavelength selection phase plate 37. Wavelength selection phase plate 37 converts the red light in the incident (blue/yellow) light into s-polarized light, converts the green light into p-polarized light, and converts the blue light into circularly polarized light.

Polarization prisms 6a and 10a have first film characteristics of transmitting p-polarized light and reflecting s-polarized light, or second film characteristics of transmitting p-polarized light and reflecting s-polarized light. Here, it is assumed that polarization prisms 6a and 10a have the first film characteristics.

The emitted (red/green/blue) light from wavelength selection phase plate 37 enters polarization prism 6a. The green light (p-polarized light) passes through polarization prism 6a, and the red light (s-polarized light) is reflected by polarization prism 6a. The blue light (circularly polarized light) is polarization-separated by polarization prism 6a into transmitted light and reflected light that have the same light intensity.

The transmitted (green/blue) light through polarization prism 6a enters DMD 9a via TIR prism 7a. DMD 9a alternately forms a green image and a blue image. On the other hand, the reflected (red/blue) light of polarization prism 6a enters DMD 9b via lens 3d, mirror 8a, lens 3e, mirror 8b and TIR prism 7b. DMD 9b alternately forms a red image and a blue image.

The blue/green image light (p-polarized light) from DMD 9a enters polarization prism 10a via TIR prism 7a. The blue/red image light (s-polarized light) from DMD 9b enters polarization prism 10a via TIR prism 7b. The blue/green image light (p-polarized light) passes through polarization prism 10a and enters projection lens 1. The blue/red image light (s-polarized light) is reflected by polarization prism 10a and enters projection lens 1.

In a case where polarization prisms 6a and 10a have the second film characteristics, the green light (p-polarized light) is reflected by polarization prism 6a, and the red light (s-polarized light) passes through polarization prism 6a. In this case, DMD 9a alternately forms the red image and the blue image, and DMD 9b alternately forms the green image and the blue image. The blue/red image light (s-polarized light) from DMD 9a passes through polarization prism 10a and enters projection lens 1. The blue/green image light (p-polarized light) is reflected by polarization prism 10a and enters projection lens 1.

The signal processing/control system is the same as that described in the first or second example embodiment. The projector in this example embodiment also exerts working-effects analogous to those in the first or second example embodiment.

Seventh Example Embodiment

FIG. 17 is a schematic diagram showing an optical system of a two-plate projector according to a seventh example embodiment. In the optical system of the projector in this example embodiment, phase plate 5 is removed, polarization prisms 6a and 10a are adopted instead of polarization dichroic prisms 6 and 10, and light source 2b is adopted instead of light source 2. The other elements are analogous to those of the optical system described in the first example embodiment. In FIG. 17, for the sake of convenience, a blue optical path is indicated by chain lines.

Light source 2b includes green LD 38G, red LD 38R, blue LD 38B, dichroic mirrors 29 and 30, and λ/4-plate 41. The optical axis of red LD 38R and the optical axis of blue LD 38B are orthogonal to each other. Dichroic mirror 39 is disposed at the intersection of these optical axes. Dichroic mirror 39 has film characteristics of transmitting light in the blue wavelength range and reflecting light in the red wavelength range. λ/4-plate 41 is disposed between blue LD 38B and dichroic mirror 39.

Blue light from blue LD 38B enters one surface of dichroic mirror 39 at an incident angle of about 45 degrees. Red light from red LD 38R enters the other surface of dichroic mirror 39 at an incident angle of about 45 degrees. The blue light from blue LD 38B passes through dichroic mirror 39. Red light from red LD 38R is reflected by dichroic mirror 39 in a direction identical to that of the transmitted blue light. The optical axis of emitted light from dichroic mirror 39 (transmitted blue light and reflected red light) coincides with the optical axis of blue LD 38B.

The optical axis of emitted light from dichroic mirror 39 and the optical axis of green LD 38G are orthogonal to each other. Dichroic mirror 40 is disposed at the intersection of these optical axes. Dichroic mirror 40 has film characteristics of transmitting light in the blue wavelength range and light in the red wavelength range, and reflecting light in the green wavelength range.

The emitted (blue/red) light from dichroic mirror 39 enters one surface of dichroic mirror 40 at an incident angle of about 45 degrees. Green light from green LD 38G enters the other surface of dichroic mirror 40 at an incident angle of about 45 degrees. The blue light and red light from dichroic mirror 39 passes through dichroic mirror 40. Green light from green LD 38G is reflected by dichroic mirror 40 in a direction identical to that of the transmitted blue/red light. The optical axis of emitted light from dichroic mirror 40 (transmitted blue/red light and reflected green light) coincides with the optical axis of blue LD 38B.

The emitted (blue/red/green) light from dichroic mirror 40 is the output light of light source 2b. The output (blue/red/green) light of light source 2b passes through lens 3a, light tunnel 4, lens 3b and lens 3c, and enters polarization prism 6a.

Polarization prisms 6a and 10a have first film characteristics of transmitting p-polarized light and reflecting s-polarized light, or second film characteristics of transmitting p-polarized light and reflecting s-polarized light. Here, it is assumed that polarization prisms 6a and 10a have the first film characteristics.

Green LD 38G is disposed so as to allow p-polarized light to enter polarization prism 6a. Red LD 38R is disposed so as to allow s-polarized light to enter polarization prism 6a. Meanwhile, λ/4-plate 41 is disposed between blue LD 38B and dichroic mirror 39. Blue LD 38B is disposed so as to allow circularly polarized light to enter polarization prism 6a.

The green light (p-polarized light) passes through polarization prism 6a, and the red light (s-polarized light) is reflected by polarization prism 6a. The blue light (circularly polarized light) is polarization-separated by polarization prism 6a into transmitted light and reflected light that have the same light intensity.

The transmitted (green/blue) light through polarization prism 6a enters DMD 9a via TIR prism 7a. DMD 9a alternately forms a green image and a blue image. On the other hand, the reflected (red/blue) light of polarization prism 6a enters DMD 9b via lens 3d, mirror 8a, lens 3e, mirror 8b and TIR prism 7b. DMD 9b alternately forms a red image and a blue image.

The blue/green image light (p-polarized light) from DMD 9a enters polarization prism 10a via TIR prism 7a. The blue/red image light (s-polarized light) from DMD 9b enters polarization prism 10a via Tilt prism 7b. The blue/green image light (p-polarized light) passes through polarization prism 10a and enters projection lens 1. The blue/red image light (s-polarized light) is reflected by polarization prism 10a and enters projection lens 1.

In a case where polarization prisms 6a and 10a have the second film characteristics, the green light (p-polarized light) is reflected by polarization prism 6a, and the red light (s-polarized light) passes through polarization prism 6a. In this case, DMD 9a alternately forms the red image and the blue image, and DMD 9b alternately forms the green image and the blue image. The blue/red image light (s-polarized light) from DMD 9a passes through polarization prism 10a and enters projection lens 1. The blue/green image light (p-polarized light) is reflected by polarization prism 10a and enters projection lens 1.

The signal processing/control system has the configuration described in the first or second example embodiment, but is different in that light source controller 11b turns on green LD 38G, red LD 38R and blue LD 38B at a predetermined cycle. Specifically, light source controller 11b turns off green LD 38G and red LD 38R and turns on blue LD 38B in period T1 shown in FIG. 9, and turns on both green LD 38G and red LD 38R and turns off blue LD 38B in period T2 shown in FIG. 9. The other operations are as described in the first or second example embodiment.

The projector in this example embodiment also exerts working-effects analogous to those in the first or second example embodiment.

In a case where sufficient polarization separation cannot be achieved owing to the variation in LD polarization degree and the variation in film characteristics of polarization prism 6a, it is desirable to dispose a polarization conversion element, a polarization plate, a wavelength selection phase plate or the like.

If linearly polarized blue light from blue LD 38B is polarization-separated by polarization prism 6a into transmitted blue light and reflected blue light that have the same light intensity, λ/4-plate 41 may be removed. In this case, as with blue laser 20 described in the third example embodiment, blue LD 38B is disposed so as to cause the polarization axis to be in a direction of 45°, or disposed so as to make the p-polarized light and the s-polarized light have the same light intensity.

In the first to seventh example embodiments described above, the video signal is not limited to an 8-bit signal. In a case where bit allocation can be performed for the video signal of the blue image, a multiple-bit video signal may be used.

Eighth Example Embodiment

FIG. 18 is a block diagram showing a configuration of a projector according to an eighth example embodiment.

Referring to FIG. 18, the projector includes controller 300, light source/optical unit 301, first and second image forming elements 302 and 303, and projection lens 304.

First image forming element 302 includes micromirrors each forming a pixel. Each micromirror reflects light in directions that are different according to an on-state and an off-state. An image is formed by reflected light from the micromirrors in the on state. Second image forming element 303 has a configuration analogous to that of first image forming element 302. Projection lens 304 projects images formed on first and second image forming elements 302 and 303.

Light source/optical unit 301 irradiates first image forming element 302 with the first blue light, and irradiates second image forming element 303 with the second blue light, in the first display period between the first and second display periods obtained by dividing one frame period. Light source/optical unit 301 irradiates first image forming element 302 with the green light, and irradiates second image forming element 303 with the red light, in the second display period. Here, the light intensity of the first blue light and the light intensity of the second blue light can be appropriately set. For example, the light intensities can be set to be the same.

Video signals including red images, blue images and green images that each have gradations represented by multiple bits are input into controller 300. Controller 300 controls on and off of each micromirror of first image forming element 302 and second image forming element 203 on the basis of the video signal of the blue image, in the first display period, and controls on and off of each micromirror of first image forming element 302 and second image forming element 303 on the basis of the video signals of the green image and the red image, in the second display period. For the video signal of the blue image, controller 300 allocates multiple bits to first image forming element 302 and second image forming element 203.

The projector in this example embodiment also exerts working-effects analogous to those in the first example embodiment.

In this example embodiment, for the video signal of the blue image, controller 300 may allocate the least significant bit among the multiple bits to one of the first and second image forming elements 302 and 303. In this case, controller 300 may allocate the bits other than the least significant bit among the multiple bits to first and second image forming elements 302 and 303. Furthermore, for two or more bits including the most significant bit among the multiple bits, controller 300 may divide the period represented by bits into divided periods with respect to each predetermined time period, and combine the divided periods for respective bits so as to coincide with the first display period.

For the video signal of the blue image, controller 300 may allocate the most significant bit among the multiple bits to one of first and second image forming elements 302 and 303, and allocate less significant bits other than the most significant bit to the other of first and second image forming elements 302 and 303.

In the projector of this example embodiment, light source/optical unit 301 may include the configuration of any of the first to seventh example embodiments.

Another Example Embodiment

A projector of this other example embodiment includes: first and second image forming elements that each include micromirrors each forming a pixel, the micromirrors each reflecting light in directions different according to an on-state and an off-state to allow images to be formed by reflected light from the micromirrors in the on-state; a projection lens that projects the images formed on the first and second image forming elements; and a light source/optical unit that irradiates the first and second image forming elements with first blue light and second blue light in a first display period between first and second display periods that are obtained by dividing one frame period, and irradiates the first and second image forming elements with green light and red light in the second display period.

The projector of this other example embodiment can increase the light intensity (or luminance) of the blue image by allowing both the first and second image forming elements to form the blue image. The display period for blue can be reduced accordingly, and the display periods for green and red can be increased. Consequently, the brightness of the image can be increased.

According to the projector of the other embodiment, the configurations capable of bit allocation as described in the first to eighth example embodiments can be provided.

REFERENCE SIGNS LIST

300 Controller
301 Light source/optical unit
302 First image forming element
303 Second image forming element
304 Projection lens

The invention claimed is:

1. A projector, comprising:
    first and second image forming elements that each include micromirrors each forming a pixel, the micromirrors each reflecting light in directions different between an on-state and an off-state to allow images to be formed by reflected light from the micromirrors in the on-state;
    a projection lens that projects the images formed on the first and second image forming elements;
    a light source/optical unit that irradiates the first and second image forming elements with first blue light and second blue light in a first display period, and irradiates the first and second image forming elements with green light and red light in a second display period, wherein the first display period and the second display period are obtained by dividing one frame period; and
    a controller that receives video signals of a red image, a blue image and a green image that each have gradations represented by multiple bits, controls on and off of each micromirror of the first and second image forming elements, based on the video signal of the blue image, in the first display period, and controls on and off of each micromirror of the first and second image forming elements, based on the video signals of the green image and the red image, in the second display period,
    wherein for the video signal of the blue image, the controller allocates the multiple bits to the first and second image forming elements.

2. The projector according to claim 1,
    wherein for the video signal of the blue image, the controller allocates a least significant bit among the multiple bits to one of the first and second image forming elements.

3. The projector according to claim 2,
    wherein the controller allocates bits other than the least significant bit among the multiple bits to the first and second image forming elements.

4. The projector according to claim 3,
    wherein for two or more bits including a most significant bit among the multiple bits, the controller divides a period represented by each of the two or more bits into divided periods with respect to each predetermined time period, and combines the divided periods for respective bits so as to coincide with the first display period.

5. The projector according to claim 1,
    wherein for the video signal of the blue image, the controller allocates a most significant bit among the multiple bits to one of the first and second image forming elements, and allocates less significant bits other than the most significant bit to another of the first and second image forming elements.

6. The projector according to claim 1,
    wherein each of the green light and the red light is fluorescence emitted from a phosphor excited by blue light output from a blue laser, and
    each of the first blue light and the second blue light is blue light from the blue laser.

7. An image display method performed in a projector comprising first and second image forming elements that each include micromirrors each forming a pixel and in which the micromirrors each reflects light in directions different between an on-state and an off-state to allow images to be formed by reflected light from the micromirrors in the on-state, the projector projecting the images formed on the first and second image forming elements, the method comprising:
    obtaining first and second display periods by dividing one frame period;
    irradiating the first and second image forming elements with first blue light and second blue light in the first display period;
    irradiating the first and second image forming elements with green light and red light in the second display period; and
    receiving, by a controller, video signals of a red image, a blue image and a green image that each have gradations represented by multiple bits, controlling on and off of each micromirror of the first and second image forming elements, based on the video signal of the blue image, in the first display period, and controlling, on and off of each micromirror of the first and second image forming elements, based on the video signals of the green image and the red image, in the second display period,
    wherein for the video signal of the blue image, the controller allocates the multiple bits to be first and second image forming elements.

* * * * *